US008357848B2

(12) United States Patent
Andrews et al.

(10) Patent No.: US 8,357,848 B2
(45) Date of Patent: Jan. 22, 2013

(54) SYSTEM AND METHOD FOR POLICY BASED AUTOMATIC SCORING OF VOCAL PERFORMANCES

(76) Inventors: Keith Michael Andrews, San Jose, CA (US); Jerald Perry, Stockton, CA (US); Christopher Hercules Claudatos, San Jose, CA (US)

(*) Notice: Subject to any disclaimer, the term of this patent is extended or adjusted under 35 U.S.C. 154(b) by 26 days.

(21) Appl. No.: 12/975,321

(22) Filed: Dec. 21, 2010

(65) Prior Publication Data

US 2011/0146478 A1 Jun. 23, 2011

Related U.S. Application Data

(60) Provisional application No. 61/284,555, filed on Dec. 22, 2009.

(51) Int. Cl.
*G10H 1/22* (2006.01)
*A63F 9/24* (2006.01)
*G06F 17/40* (2006.01)
*G10L 21/00* (2006.01)

(52) U.S. Cl. .............................. 84/618; 463/7; 704/272

(58) Field of Classification Search .................... 84/609, 84/611, 616, 618; 434/307 A, 307 R; 463/1, 463/7; 704/246, 250, 270, 272
See application file for complete search history.

(56) References Cited

U.S. PATENT DOCUMENTS

| 5,434,949 | A  | * | 7/1995  | Jeong ........................ 704/270 |
|-----------|----|---|---------|---------------------------------------|
| 6,182,044 | B1 | * | 1/2001  | Fong et al. .................. 704/270 |
| 7,164,076 | B2 | * | 1/2007  | McHale et al. ................ 84/616 |
| 7,379,869 | B2 | * | 5/2008  | Kendra ........................ 704/246 |
| 7,482,529 | B1 | * | 1/2009  | Flamini et al. ................ 84/645 |
| 7,806,759 | B2 | * | 10/2010 | McHale et al. ................. 463/7 |
| 2004/0172246 | A1 | * | 9/2004  | Kendra ........................ 704/246 |
| 2005/0252362 | A1 | * | 11/2005 | McHale et al. ................ 84/616 |
| 2005/0255914 | A1 | * | 11/2005 | McHale et al. ................ 463/31 |
| 2006/0009979 | A1 | * | 1/2006  | McHale et al. ............... 704/270 |
| 2010/0192752 | A1 | * | 8/2010  | Bright et al. .................. 84/610 |

* cited by examiner

*Primary Examiner* — Elvin G Enad
*Assistant Examiner* — Andrew R Millikin

(57) ABSTRACT

Systems and methods for the automatic scoring of a vocal performance are provided. The systems and methods for providing feedback and scoring a vocal performance generally relate to receiving/processing a user's vocals, measuring the various performance qualities of the performance according stored evaluation policies and rendering a score according to stored scoring policies.

1 Claim, 6 Drawing Sheets

US 8,357,848 B2

SYSTEM AND METHOD FOR POLICY BASED AUTOMATIC SCORING OF VOCAL PERFORMANCES

PRIORITY CLAIM

The present application claims priority to U.S. Provisional Patent Application Ser. No. 61/284,555, filed Dec. 22, 2009, which is incorporated in this document by reference.

FIELD OF THE INVENTION

This invention relates generally to a vocal performance evaluation application capable of providing qualitative performance feedback, performance metrics, and scores for any type of vocal performance and more particularly to an automated system and method of evaluating and scoring vocal performances for the purposes of competition, game playing, and improvement of vocal performances.

BACKGROUND OF THE INVENTION

Vocal musical performance (Rap) is a popular form of music expressed in many styles some of which emphasize spoken rhymes in a rhythmic fashion without instrumental sound (A cappella) or with instrumental or other musical accompaniment (Background Music). Some varieties of Rap are comprised of lyrics, rhymes, and sometimes orally generated sounds composed ad hoc and extemporaneously. Some varieties of Background Music consist of one or more musical instruments and/or other voices. The person who performs these rhymes is known as a Rapper. A good Rapper can perform lyrically creative rhymes in cadence and with a variety of other qualities and characteristics. This Rap is known as a Rapper's "Flow". A good Rap Flow will compliment and add a melodic enhancement to Background Music much like the addition of an instrument.

Traditional singing is judged on the range in pitch and tune. A Rapper's Flow may be judged on the rhythmic delivery of words and syllables, content of lyrics, rhymed patterns and phrases, and vocal presence. When Rappers compete against each other it is called a Rap Battle. In a Rap Battle, Rappers are typically judged by a group of their peers on how good they can Flow.

The popularity of music-based video game applications has increased in recent years due to the introduction of various computer based devices and operating systems capable of running game applications such as XBOX™ (Microsoft® Corp.), PLAYSTATION™ (Sony Entertainment Corp.) and smart mobile devices such as the iPad™, iTouch™, and iPhone™ (Apple Inc).

These computer based devices can host a variety of interactive games, including rhythm-based games such as Guitar Hero™ (Activision Publishing, Inc), pattern-based games such as Tap Tap Revenge (Developed by TAPULOUS, INC) and karaoke-based games such as SingSong (Developed by MobilMeme, Inc.). These games apply a variety of known voice processing methods and systems that can detect whether a user's vocal sequence is in pitch and tune with a stored vocal pattern or if the input response of a user is on time with a stored musical composition.

There are also pre-existing methods that have been employed to provide content and speech recognition in various computer based applications. These methods search and compare user inputted sounds and syllables to find a match from a stored database of words.

These systems and methods require previously stored songs, musical compositions, or lyrics in order to evaluate and score how well a user is able to sing a specific song, measure a user's response time to a specific pattern, and match a particular vocal signal to the stored word.

SUMMARY

The purpose of the present invention is to evaluate vocal performances (Raps) through the use of one or more performance analytic methods against a set of criteria and without comparison to any previously stored musical score, lyrics, sounds, or recordings, to produce a resultant score(s) that may be used to compare one performance against others of the same or different performers; it provides a method that applies policy driven methods to analyze and render performance score(s).

According to this invention, by capturing and processing user inputted voice signals and optional Background Music, the invention provides feedback and calculates a score. The time signatures in the captured vocal pattern are compared to the time signatures of the beat in the background music composition. The closer in timing, the higher the score. The further the timing, the lower the score. In addition, by using voice recognition techniques, words can be identified and subject matter can be evaluated and determined to be consistent. Using this same technique, the number of rhymed words/phrases can also be counted. The more consistent the subject matter is and the more rhymed words/phrases are found, the higher the score. Finally, the users Vocal Presence can be evaluated and scored based on the consistency in volume.

DETAILED DESCRIPTION OF THE INVENTION

Figure 1:
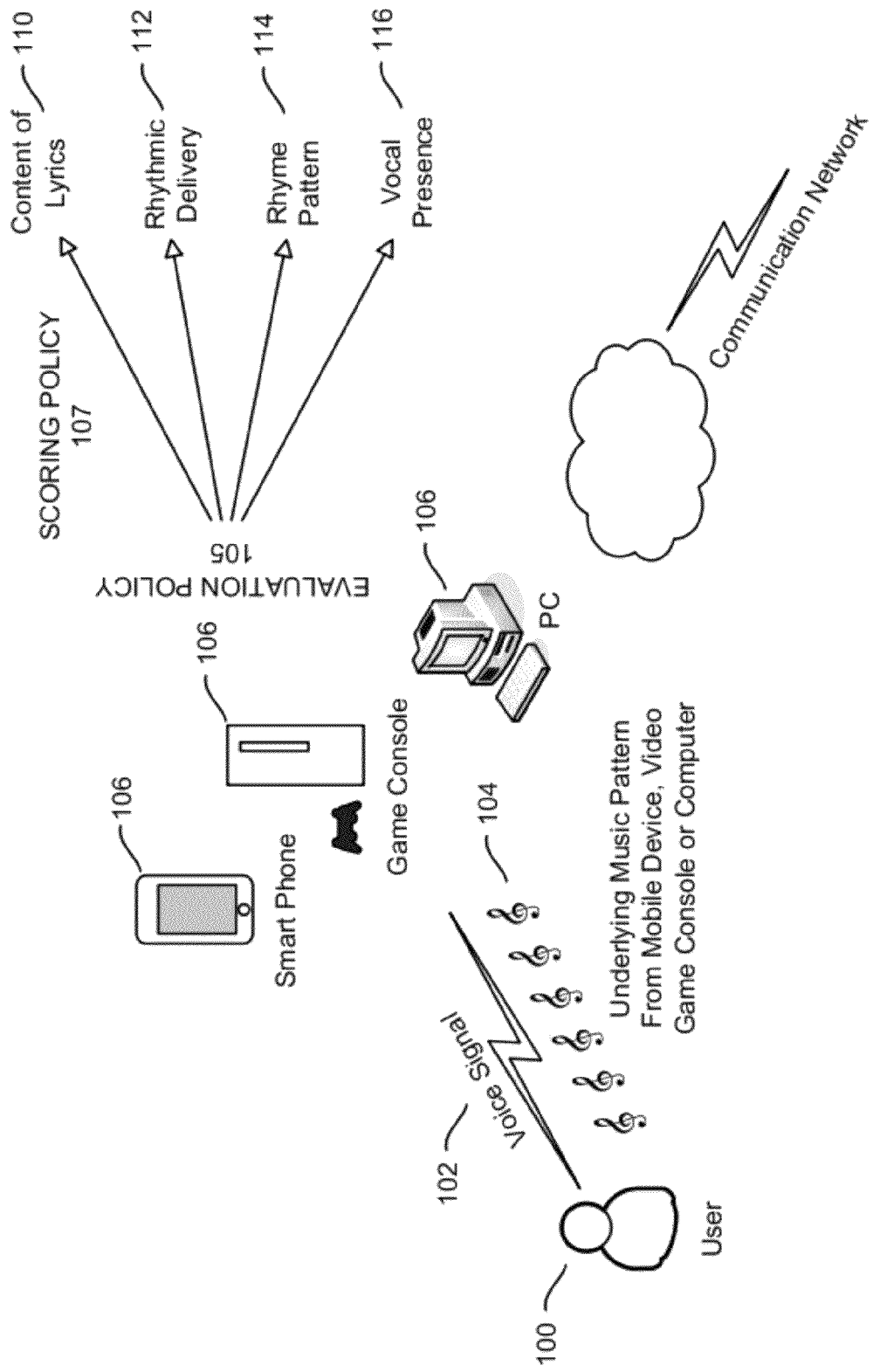
FIG. 1 is a schematic diagram of an exemplary system for implementing the methods and systems for providing feedback and scoring on a user's Rap based on the evaluation criteria specified by one or more Evaluation Policies. Such Evaluation Policies may include but are not limited to the evaluation of the content of the Rapper's lyrics, the rhythmic delivery of the words and syllables, the rhyme patterns, and vocal presence.

FIG. 1 is an illustration of an embodiment of a standalone system for implementing the methods and systems for providing feedback on a user's 100 Rap based on the evaluation criteria specified by one or more Evaluation Policies. Such Evaluation Policies may include but are not limited to the evaluation of the content of the Rapper's lyrics, the rhythmic delivery of the words and syllables, the rhyme patterns, and vocal presence. The user 100 may use a computer based device 106 such as a smart mobile phone, video game console or personal computer. The user 100 transmits voice signals 102 by way of a Rap over an optional underlying music pattern 104 from an optional music source 106 that are simultaneously received and processed with the user 100 voice signals 102. Once the voice signal 102 is processed an Evaluation Policy 105 is invoked which specifies a set of evaluation methods and criteria that are used to evaluate the Rap and may include but are not limited to the evaluation of the content of lyrics 110, rhythmic delivery 112, rhyme pattern 114, and vocal presence 116. Once the evaluation is complete, a Scoring Policy 107 is invoked which specifies a set of scoring methods and criteria that are used to process the results of the evaluation in a manner that renders a score(s). The system uses such scores to provide users with positive and negative feedback 100 as well as a method of comparing one or more user's scores against one another. Such comparisons are useful for determining the winners of Rap games or competitions.

The computer based device 106 could connect through a communication network although it is not required. In this embodiment all measurements are received and processed locally by the computer based device 106.

Figure 2:
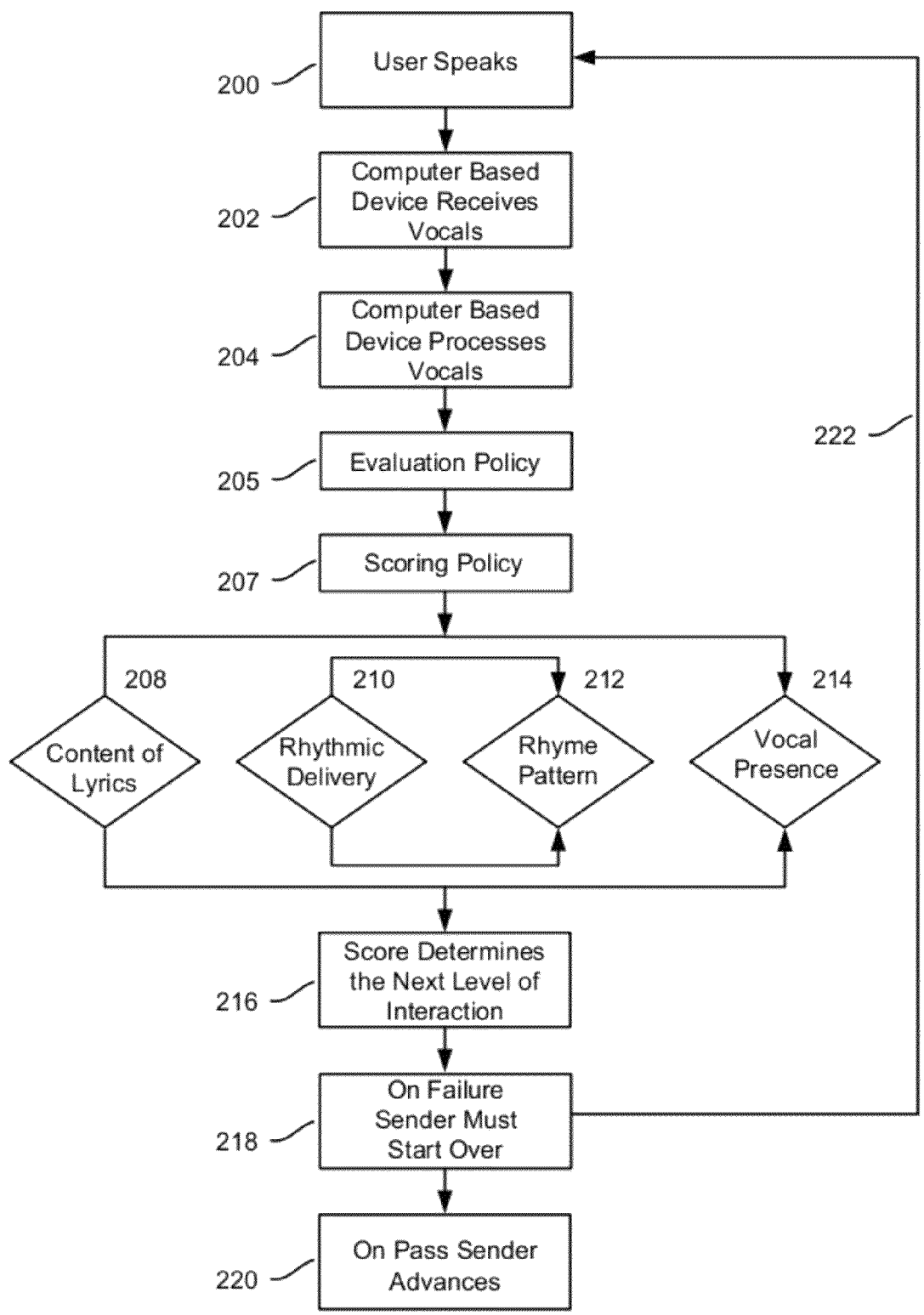
FIG. 2 is a flow diagram of an exemplary system for implementing the methods and systems for providing feedback and scoring on a user's Rap based on the evaluation criteria specified by one or more Evaluation Policies. Such Evaluation Policies may include but are not limited to the evaluation of the content of the Rapper's lyrics, the rhythmic delivery of the words and syllables, the rhyme patterns, and vocal presence.

FIG. 2 is a flow diagram of the embodiment of a standalone system and method for scoring a Rap as illustrated in (FIG. 1). The User's 200 voice signals 102 are delivered to a computer based device 202 in the form of a Rap. During the process of voice signal 102 transmission from the user 200 to the computer based device 202, Background Music 104 is concurrently but optionally played to provide the user 200 with a music pattern 104 to optionally accompany the Rap. When the Rap is delivered to the computer based device 202 the vocals are can be processed 204 and an Evaluation Policy 205 may be invoked which specifies a set of evaluation methods and criteria that are used to evaluate the Rap. Once the evaluation is complete, a Scoring Policy 207 may be invoked which specifies a set of scoring methods and criteria that are used to process the results of the evaluation in a manner that renders a score(s).

When the computer based device 202 processes the vocals they are then measured according to the Evaluation Policy 205 and may include but are not limited to the evaluation of the vocals based on the content of lyrics 208, rhythmic delivery 210, rhyme pattern 212, and vocal presence 214. Once the evaluation is complete, a Scoring Policy 207 may be invoked which specifies a set of scoring methods and criteria that are used to process the results of the evaluation in a manner that renders a score(s). The system may use such scores to provide users with positive and negative feedback 216 as well as a method of comparing one or more user's scores against one another. Such comparisons are useful for determining the winners of Rap games or competitions.

The evaluation methods specified by the Evaluation Policy may include but are not limited to the measurement of the content of lyrics 208. When the voice signals 102 are captured, the content of lyrics 208 are then analyzed to find recognizable words and to determine if those words are literally consistent. If the recognized words are not literally consistent, the user 200 may be provided feedback and a score as specified by the Scoring Policy 207. If the words are not literally consistent, the user 200 may be provided feedback and a score as specified by the Scoring Policy 207. For example, in some embodiments, the word "Poor" may be displayed to the user if the words are not consistent. If the words are literally consistent, the user 200 may be provided feedback and a score as specified by the Scoring Policy 207. For example, in some embodiments, the word "Excellent" may be displayed to the user 200 if the words are consistent."

One method for evaluation specified by the Evaluation Policy may be the evaluation of the rhythmic delivery 210 in the embodiment of this invention comprises capturing a user's 200 voice signal 102 as they are Rapping to Background Music 104. When the voice signals 102 are captured they are analyzed by the computer based device 102 to determine a voice pattern. The voice pattern is then processed according to an Evaluation Policy which may require the determination of the time signature of the performed Rap. This time signature may optionally be compared to the time signature of the Background Music 104. The Scoring Policy may make use of the alignment or lack of alignment of the time signature as a portion of the user's score.

As an example, a method for scoring the rhyme pattern 212 in a Rappers flow as illustrated in this embodiment comprises of capturing a user's 200 voice signal 102 as they are Rapping to Background Music 104 from a computer based device 106. When the voice signal 102 is captured it can then be analyzed according to the Evaluation Policy to find recognizable words that rhyme and the Scoring Policy determines the score result in part by the evaluation of the rhyme pattern.

An example of a method for scoring the vocal presence 214 in a Rapper's flow as illustrated in this embodiment comprises of capturing a user's 200 voice signal 102 as they are Rapping to an optional Background Music 104 from a computer based device 106. When the voice signal 102 is captured it is analyzed to determine a voice pattern. According to an Evaluation Policy the dB may then be measured in each bar of the voice pattern. The Scoring Policy then determines that the more dB variance between each bar, the more negative the feedback and the lower the score. The less dB variance between each bar, the more positive the feedback and the higher the score.

The calculation of the score 216 according to the Scoring Policy will determine the next level of interaction. In some cases, the Scoring Policy could require a user 200 with negative score that results in failure to start over 218. If the score is positive thus resulting in success, the user 200 could then advance to the next level 220.

Figure 3:
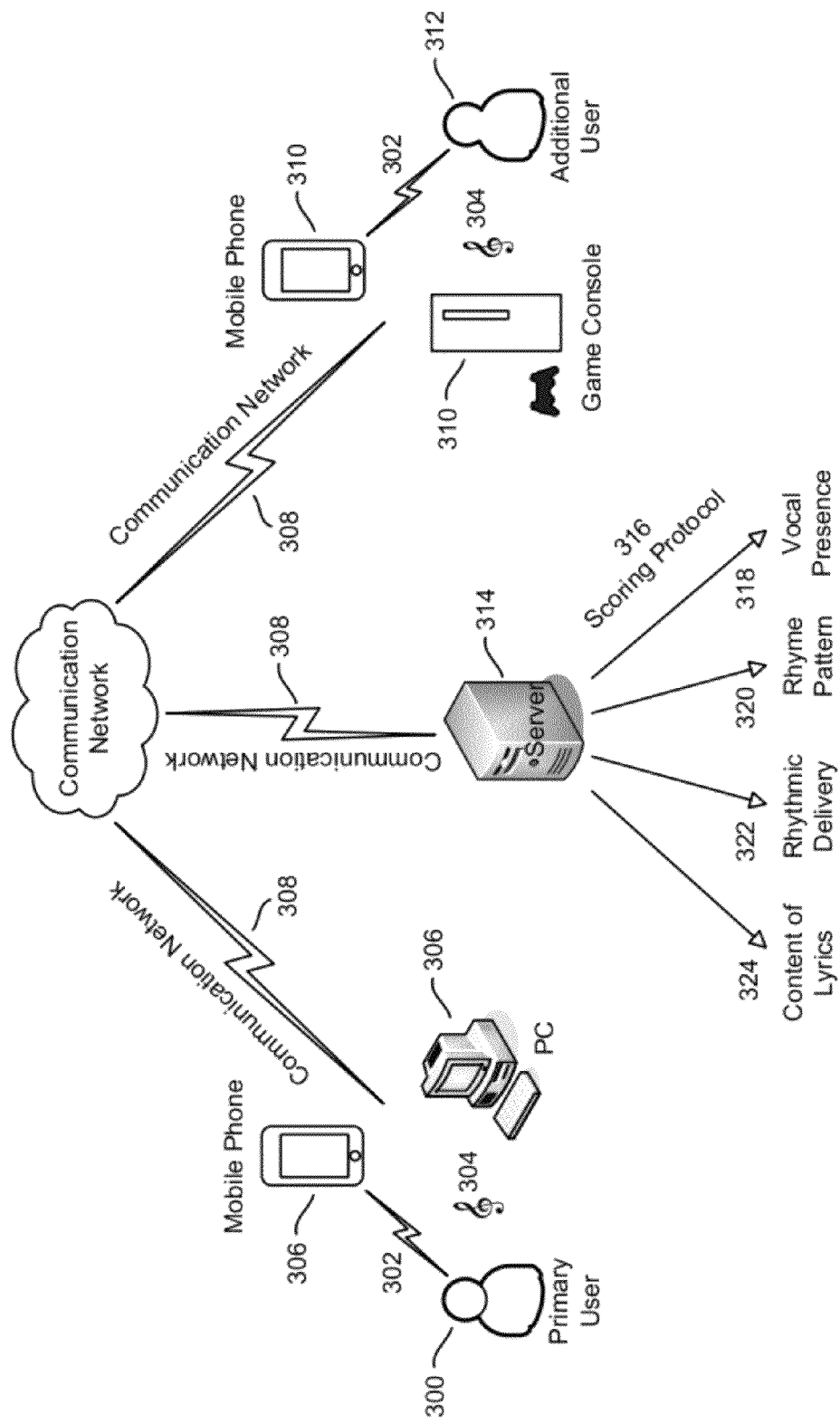
FIG. 3 is a schematic diagram of an exemplary system for implementing the methods and systems for providing feedback and scoring on a user's Rap based on the evaluation criteria specified by one or more Evaluation Policies. Such Evaluation Policies may include but are not limited to the evaluation of the content of the Rapper's lyrics, the rhythmic delivery of the words and syllables, the rhyme patterns, and vocal presence over a communication network.

FIG. 3 is an illustration of an embodiment of a system and method for scoring a Rap over a communication network. The primary user's 300 voice signals 302 are delivered to a computer based device 306 in the form of a Rap. During the process of voice signal 302 transmission from the primary user 300 to the computer based device 306 an optional Background Music 304 is being played concurrently to provide the primary user 300 with a music pattern 304 to perform the Rap against. When the Rap is delivered to the computer based device 306 the vocals are then processed and transmitted over a communication network 308 to a computer based device 314 on the receiving end of the data transmission stream.

This embodiment also illustrates the system and method for scoring a Rap when multiple users compete against each other over a communication network. When this occurs the process may be the same. The additional user's 312 voice signals 302 are delivered to a computer based device 310 in the form of a Rap. During the process of voice signal 302 transmission from the additional user 312 to the computer based device 310 an optional Background Music 304 is being played concurrently to provide the additional user 312 with a music pattern 304 to perform the Rap against. When the Rap flow is delivered to the computer based device 310 the vocals can then be processed and transmitted over a communication network 308 to a computer based device 314 on the receiving end of the data transmission stream.

Once the data is received by the backend server 314 or back end communication device 314 it can be processed and scored based on the Evaluation Policies and Scoring Policies.

Figure 4:
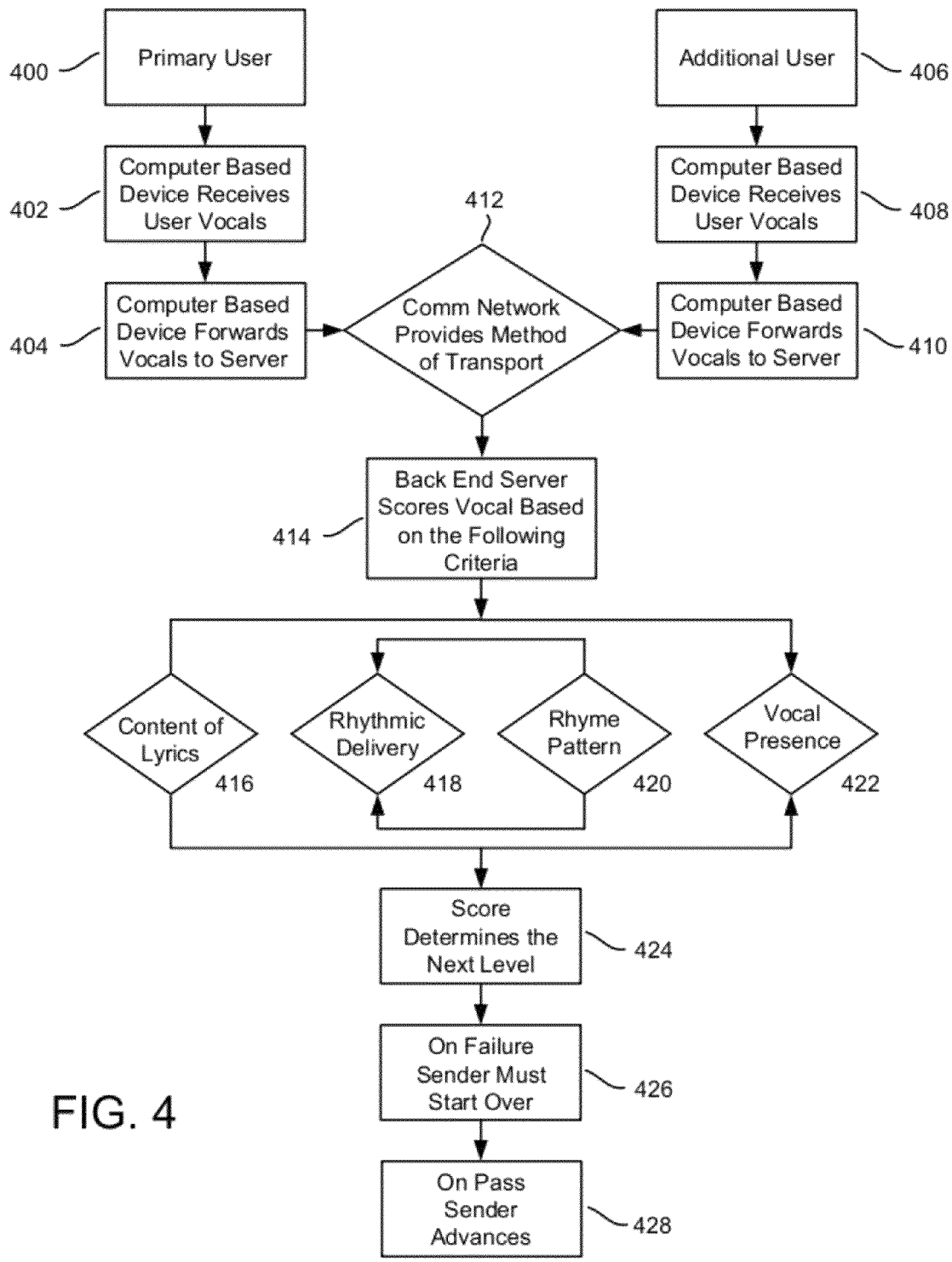
FIG. 4 is a flow diagram of an exemplary system for implementing the methods and for providing feedback and scoring on a user's Rap based on the evaluation criteria specified by one or more Evaluation Policies. Such Evaluation Policies may include but are not limited to the evaluation of the content of the Rapper's lyrics, the rhythmic delivery of the words and syllables, the rhyme patterns, and vocal presence over a communication network.

FIG. 4 is a flow diagram of an embodiment of a system and method for scoring a Rap over a communication network as illustrated in (FIG. 3). The primary user's 400 voice signals 302 are delivered to a computer based device 402 in the form of a Rap. During the process of voice signal transmission from the primary user 400 to the computer based device 402 an optional Background Music 304 can be played concurrently to provide the user with a music pattern 304 to perform the Rap against. When the Rap is delivered to the computer based device 402 the vocals can then be processed and transmitted over a communication network 412 to a computer based device 414 on the receiving end of the data transmission stream.

This embodiment also illustrates the system and method for scoring a Rap when multiple users compete against each other over a communication network. When this occurs the process may be the same. The additional user's 406 voice signals 302 are delivered to a computer based device 402 in the form of a Rap. During the process of voice signal 302 transmission from the additional user 406 to the computer based device 408 an underlying musical pattern 304 may be played concurrently to provide the additional user 406 with a music pattern 304 to perform the Rap against. When the Rap is delivered to the computer based device 408 the vocals may then be processed and transmitted over a communication network 412 to a computer based device 414 on the receiving end of the data transmission stream.

Once the data is received by the backend server 414 or back end communication device 414 it may be processed and scored. The calculation of the score 424 will determine the next level of interaction for both users. Once the scoring is complete either positive or negative feedback may be provided to the primary user 400 and the additional user 406. Both participants next level of play is determined by the scoring results of this process. If the score is negative thus resulting in failure of either user, the Scoring Policy may require the failing user to start over 426. If the score is positive thus resulting is success for either user, the Scoring Policy may require the winning user to advance to the next level 428.

Figure 5:
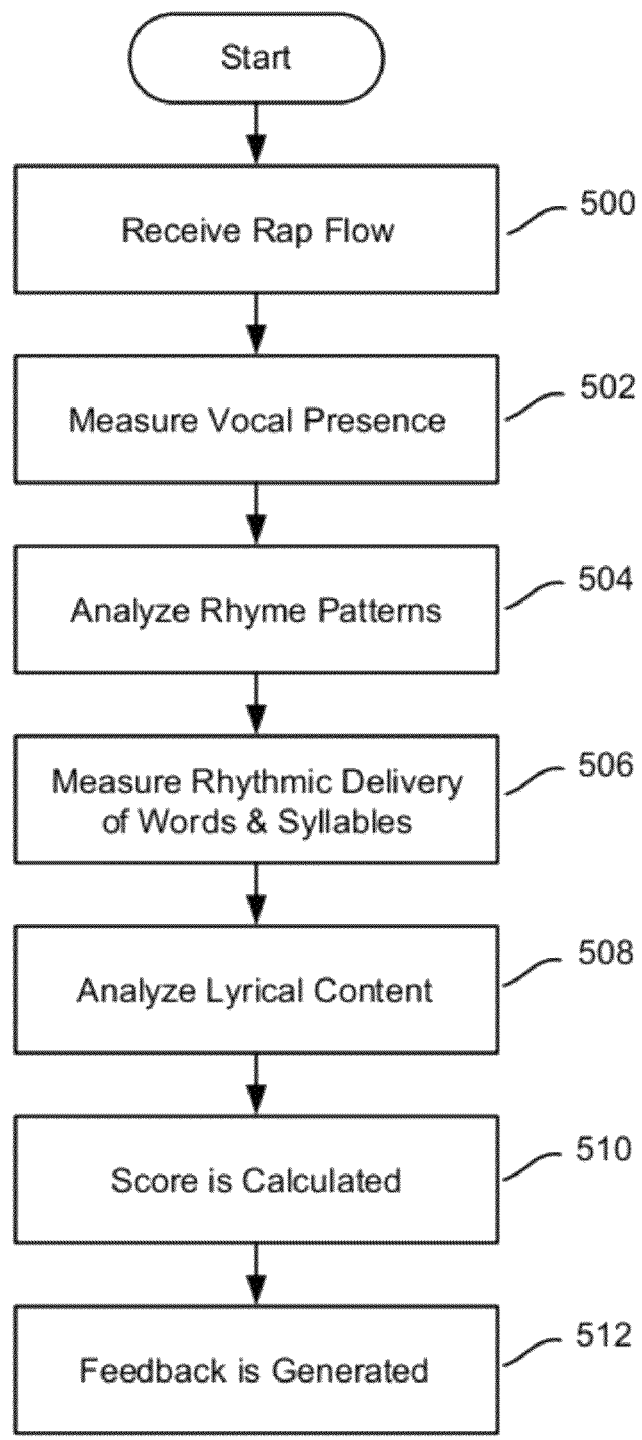
FIG. 5 is a flow diagram in further detail of an exemplary system for providing feedback and scoring on a user's Rap based on the evaluation criteria specified by one or more Evaluation Policies. Such Evaluation Policies may include but are not limited to the evaluation of the content of the Rapper's lyrics, the rhythmic delivery of the words and syllables, the rhyme patterns, and vocal presence.

FIG. 5 is a flow diagram of one possible embodiment of this invention where a Rap's 500 vocal presence 502, rhyme pattern 504, rhythmic delivery 506, and lyrical content 508 are evaluated to determine a score 510.

Figure 6:
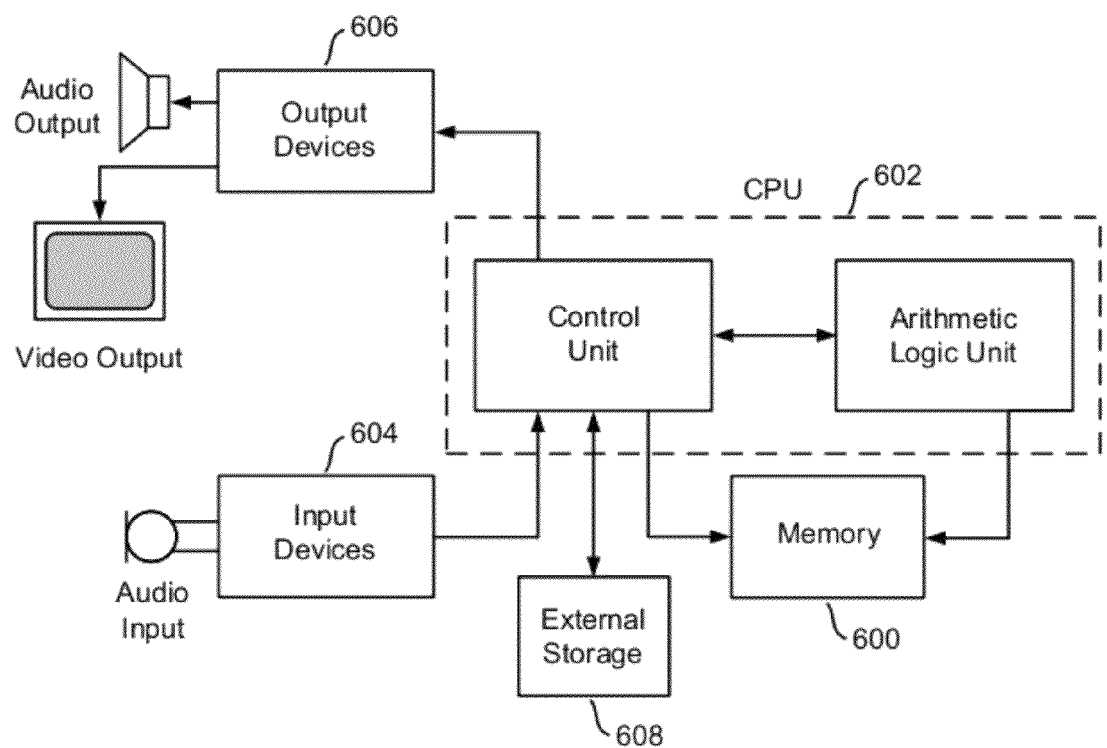
FIG. 6 is block diagram of a computer based device as illustrated in the diagrams in this embodiment. This block diagram covers the principal components of a computer based device.

FIG. 6 is a basic block diagram of an embodiment of a computer-based device capable of providing feedback to a user and scoring their Rap. For purposes of clarity, and not by way of limitation, the main components of a computer-based device capable of this invention are a CPU 602, memory 600, storage 608, input devices 604, output devices 606, and communication channels that connect them. A computer-based device could be a personal computer, game console, handheld computer, smart mobile phone, or any other suitable type of device.

We claim:

1. A method for evaluating and scoring the vocal and rhythmic delivery of words and syllables by means of one or more computer devices and one or more optional communication networks, the method comprising the steps of:
    capturing a user's voice signals as they are performing or through a recorded performance;
    invoking a stored evaluation policy that is independent of and not based on any pre-recorded vocal performance of another, said evaluation policy specifying one or more evaluation methods to apply to the captured voice signals
    analyzing said voice signals according to the invoked evaluation policy specified methods; and
    invoking a stored scoring policy that is independent of and not based on any pre-recorded vocal performance, said scoring policy specifying scoring methods to apply to evaluated voice signals, including a method of assigning a score value based on a rhyming of lyrics in the user's performance.

* * * * *